(12) United States Patent
Zhao (10) Patent No.: US 11,740,513 B2
(45) Date of Patent: Aug. 29, 2023

(54) BASE PLATE AND LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Rentang Zhao, Shenzhen (CN)

( * ) Notice: Subject to any disclaimer, the term of this patent is extended or adjusted under 35 U.S.C. 154(b) by 599 days.

(21) Appl. No.: 16/615,134

(22) PCT Filed: Sep. 20, 2019

(86) PCT No.: PCT/CN2019/106901
§ 371 (c)(1),
(2) Date: Nov. 20, 2019

(87) PCT Pub. No.: WO2021/007951
PCT Pub. Date: Jan. 21, 2021

(65) Prior Publication Data
US 2022/0244586 A1    Aug. 4, 2022

(30) Foreign Application Priority Data
Jul. 17, 2019   (CN) .......................... 201910644590.4

(51) Int. Cl.
*G02F 1/1339*    (2006.01)
*G02F 1/1333*    (2006.01)
(Continued)

(52) U.S. Cl.
CPC .......... *G02F 1/1339* (2013.01); *G02F 1/1362* (2013.01); *G02F 1/133357* (2021.01); *G02F 1/133512* (2013.01); *G02F 1/133514* (2013.01)

(58) Field of Classification Search
CPC .................................................... G02F 1/1339
See application file for complete search history.

(56) References Cited

U.S. PATENT DOCUMENTS

2007/0139967 A1    6/2007  Peng
2016/0161778 A1*   6/2016  Nishino ................ G02F 1/1339
                                                        349/42
(Continued)

FOREIGN PATENT DOCUMENTS

CN            101726913 A       6/2010
CN            202372734 U       8/2012
(Continued)

*Primary Examiner* — Edmond C Lau
(74) *Attorney, Agent, or Firm* — JMB DAVIS BEN-DAVID (57) ABSTRACT

The present invention provides a base plate, an LCD panel, and an LCD device. In a sealing region of the base plate, a plurality of protrusions or notches are defined on a top layer, thereby making a surface area of the top layer is greater than an area of an orthographic projection of the top layer on the substrate. At least one of a first substrate or second substrate of the LCD panel is the base plate. A contact area between a sealant and the top layer is greater than an area of an orthographic projection of the sealant on the substrate. Therefore, a contact area between the sealant and the base plate is increased, and adhesion between the sealant and the array substrate is increased.

7 Claims, 5 Drawing Sheets

(51) Int. Cl.
      *G02F 1/1335*    (2006.01)
      *G02F 1/1362*    (2006.01)

(56) References Cited

U.S. PATENT DOCUMENTS

2020/0183205 A1*   6/2020   Chen .................... G02F 1/1337
2020/0387018 A1*  12/2020   Wu .................. G02F 1/133514

FOREIGN PATENT DOCUMENTS

| | | |
|---|---|---|
| CN | 202693959 U | 1/2013 |
| CN | 103885251 A | 6/2014 |
| CN | 106249487 A | 12/2016 |
| CN | 207366901 U | 5/2018 |
| CN | 108398835 A | 8/2018 |

* cited by examiner

BASE PLATE AND LIQUID CRYSTAL DISPLAY PANEL

FIELD OF INVENTION

The present invention relates a field of display technology and, more particularly, to a base plate and a liquid crystal display panel.

BACKGROUND OF INVENTION

In a thin film transistor-liquid crystal display (TFT-LCD), a panel is formed by a one drop filling (ODF) process which fills a cell formed by an array substrate and a color filter with liquids crystals. The array substrate and the color filter are sealed by a sealant disposed on a non-display region of a periphery of the panel. To ensure that the panel can normally be used, the sealant must have a certain width about 1300 μm. Therefore, the sealant can provide sufficient adhesion to avoid separation of the array substrate and the color filter.

With rapid development of television (TV) panel technology, panel products having narrow frames are becoming more and more popular. In other words, a non-display region of a periphery of a TV panel must be narrower, and width of a sealant must be narrower (even less than 300 μm) as well. However, if the width of the sealant is too narrow, the sealant can't provide sufficient adhesion. Therefore, the array substrate and the color filter are prone to separation.

To sum up, there is a problem that adhesion between an array substrate and a color filter is not sufficient if width of a sealant is too narrow.

SUMMARY OF INVENTION

The present invention provides a base plate and a liquid crystal (LCD) display panel to alleviate the problem that adhesion between an array substrate and a color filter is not sufficient if width of a sealant is too narrow.

To solve the above problem, technical solutions provided by the present invention are described as follows:

The present invention provides a base plate including a substrate and a top layer disposed on the substrate. The top layer is the uppermost layer of the base plate. A surface area of the top layer in a sealing region is greater than an area of an orthographic projection of the top layer on the substrate in the sealing region.

According to the base plate provided by one embodiment of the present invention, the base plate is an array substrate, and the top layer is a planarization layer.

According to the base plate provided by one embodiment of the present invention, the base plate is a color filter, and the top layer is a black matrix layer.

According to the base plate provided by one embodiment of the present invention, a plurality of notches are defined in the top layer in the sealing region.

According to the base plate provided by one embodiment of the present invention, a cross-cross-sectional shape of each of the notches is a rectangle.

According to the base plate provided by one embodiment of the present invention, a cross-cross-sectional shape of each of the notches is a triangle.

According to the base plate provided by one embodiment of the present invention, a cross-cross-sectional shape of each of the notches is a trapezoid.

According to the base plate provided by one embodiment of the present invention, a cross-cross-sectional shape of each of the notches is an arc.

According to the base plate provided by one embodiment of the present invention, a plurality of protrusions are defined in the top layer in the sealing region.

According to the base plate provided by one embodiment of the present invention, a cross-cross-sectional shape of each of the protrusions is a rectangle.

According to the base plate provided by one embodiment of the present invention, a cross-cross-sectional shape of each of the protrusions is a triangle.

According to the base plate provided by one embodiment of the present invention, a cross-cross-sectional shape of each of the protrusions is a trapezoid.

According to the base plate provided by one embodiment of the present invention, a cross-cross-sectional shape of each of the protrusions is an arc.

The present invention further provides a liquid crystal display (LCD) panel comprising a first substrate, wherein the first substrate comprises the base plate provided by the present invention; a second substrate disposed corresponding to the first substrate; a sealant disposed on a sealing region between the first substrate and the second substrate to form a sealed space, wherein a contact area between the sealant and the first substrate is greater than an area of an orthographic projection of the sealant on the substrate; and a plurality of liquid crystals filled in the sealed space.

According to the LCD panel provided by one embodiment of the present invention, the second substrate comprises the base plate provided by the present invention.

According to the LCD panel provided by one embodiment of the present invention, a plurality of protrusions are defined in a top layer of the first substrate in the sealing region, and a plurality of protrusions are defined in a top layer of the second substrate in the sealing region.

According to the LCD panel provided by one embodiment of the present invention, a plurality of notches are defined in a top layer of the first substrate in the sealing region, and a plurality of notches are defined in a top layer of the second substrate in the sealing region.

According to the LCD panel provided by one embodiment of the present invention, a plurality of protrusions are defined in a top layer of the first substrate in the sealing region, and a plurality of notches are defined in a top layer of the second substrate in the sealing region.

According to the LCD panel provided by one embodiment of the present invention, a plurality of notches are defined in a top layer of the first substrate in the sealing region, and a plurality of protrusions are defined in a top layer of the second substrate in the sealing region.

The present invention further provides a liquid crystal display (LCD) device, comprising the LCD panel provided by the present invention.

Regarding the beneficial effects: the present invention provides a base plate, an LCD panel, and an LCD device. In a sealing region of the base plate, a plurality of protrusions or notches are defined on a top layer, thereby making a surface area of the top layer is greater than an area of an orthographic projection of the top layer on the substrate. At least one of a first substrate of the LCD panel or a second substrate of the LCD panel is the base plate. A sealant is disposed on a sealing region between the first substrate and the second substrate to form a sealed space. The plurality of protrusions or notches are defined on the top layer of at least one of the first substrate or the second substrate in the sealing region. A contact area between the sealant and the top layer is greater than an area of an orthographic projection of the sealant on the substrate. Therefore, a contact area between the sealant and the base plate is increased under the circumstance that width of the sealant is narrow, which solves the problem that adhesion between an array substrate and a color filter is not sufficient if the width of the sealant is too narrow.

DESCRIPTION OF DRAWINGS

The accompanying figures to be used in the description of embodiments of the present disclosure or prior art will be described in brief to more clearly illustrate the technical solutions of the embodiments or the prior art. Apparently, the accompanying figures described below are only part of the embodiments of the present disclosure, from which figures those skilled in the art can derive further figures without making any inventive efforts.

DETAILED DESCRIPTION OF PREFERRED EMBODIMENTS

The embodiments of the present invention are described in detail hereinafter. Examples of the described embodiments are given in the accompanying drawings. In the description of the present invention, it should be understood that terms such as "upper," "lower," "front," "rear," "left," "right," "inside," "outside," "lateral" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present invention. In the drawings, the identical or similar reference numerals constantly denote the identical or similar elements or elements having the identical or similar functions.

Embodiments of the present invention can alleviate the problem that adhesion between an array substrate and a color filter is not sufficient if width of a sealant is too narrow.

Figure 1:
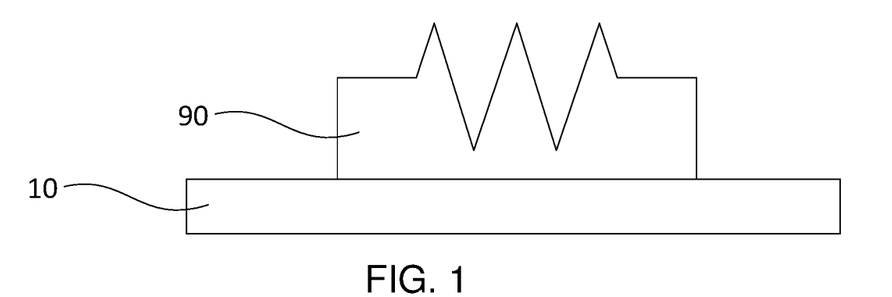
FIG. 1 is a first schematic structural diagram of a sealing region of a base plate according to one embodiment of the present invention.

In one embodiment, as shown in FIG. 1, the present embodiment provides a base plate including a substrate 10 and a top layer 90 disposed on the substrate 10, wherein the top layer 90 is the uppermost layer of the base plate. A surface area of the top layer 90 in a sealing region is greater than an area of an orthographic projection of the top layer 90 on the substrate 10 in the sealing region.

Figure 2:
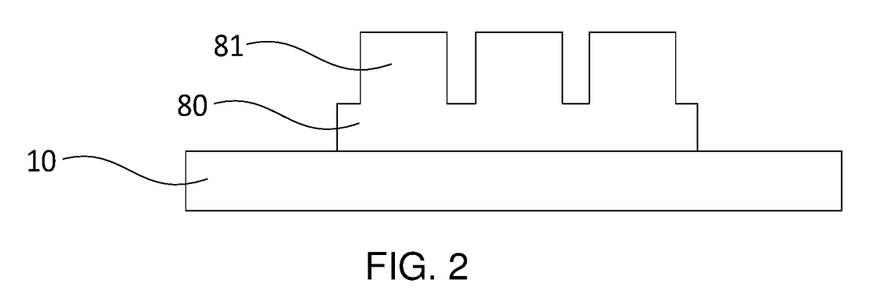
FIG. 2 is a second schematic structural diagram of a sealing region of a base plate according to one embodiment of the present invention.

In one embodiment, the base plate is an array substrate, and the top layer is a planarization layer 80. As shown in FIG. 2, a surface area of a planarization layer 80 in a sealing region is greater than an area of an orthographic projection of the planarization layer 80 on the substrate 10 in the sealing region.

In one embodiment, material of the planarization layer 80 is silicon oxide, silicon nitride, silicon oxynitride, or combinations thereof, or an organic insulating polymer. The above materials can be deposited on the planarization layer 80 by physical vapor deposition or chemical vapor deposition.

In one embodiment, the planarization layer 80 is exposed by a mask to form an exposed region. After that, the exposed region is developed to form a plurality of desired protrusion patterns in a sealing region of the array substrate. Then, the desired protrusion patterns are etched to form a plurality of desired protrusions 81, as shown in FIG. 2.

Figure 3:
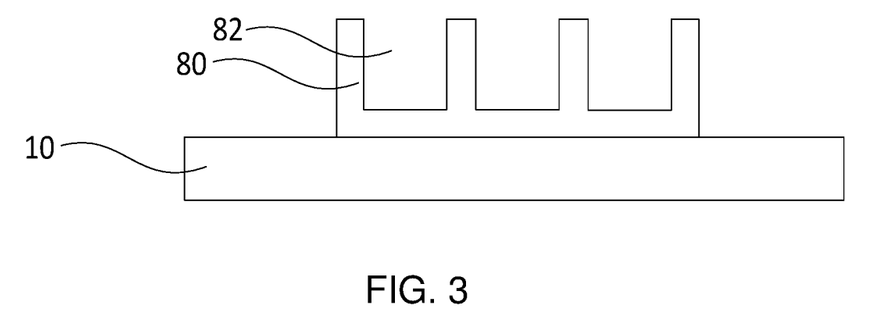
FIG. 3 is a third schematic structural diagram of a sealing region of a base plate according to one embodiment of the present invention.

In one embodiment, the planarization layer 80 is exposed by a mask to form an exposed region. After that, the exposed region is developed to form a plurality of desired notch patterns in a sealing region of the array substrate. Then, the desired notch patterns are etched to form a plurality of desired notches 82, as shown in FIG. 3.

In one embodiment, a cross-sectional shape of each of the protrusions formed from the planarization layer 80 or each of the notches formed from the planarization layer 80 is at least one of a rectangle, a triangle, an arc, or a trapezoid.

In one embodiment, a cross-sectional shape of each of the protrusions formed from the planarization layer 80 is a rectangle, as shown in FIG. 2.

Figure 4:
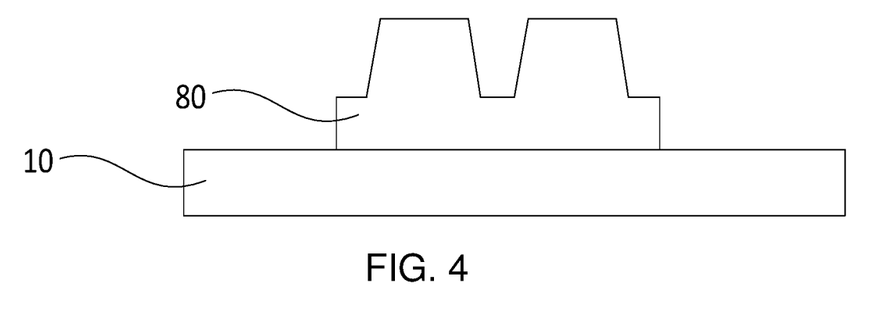
FIG. 4 is a fourth schematic structural diagram of a sealing region of a base plate according to one embodiment of the present invention.

In one embodiment, a cross-sectional shape of each of the protrusions formed from the planarization layer 80 is a trapezoid, as shown in FIG. 4.

In one embodiment, a cross-sectional shape of each of the notches formed from the planarization layer 80 is a triangle, as shown in FIG. 1.

Figure 5:
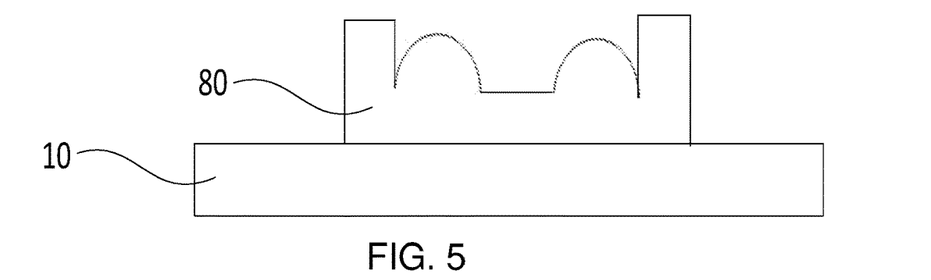
FIG. 5 is a fifth schematic structural diagram of a sealing region of a base plate according to one embodiment of the present invention.

In one embodiment, a cross-sectional shape of each of the notches formed from the planarization layer 80 is an arc, as shown in FIG. 5.

The present embodiment only lists a part of the cross-sectional shapes, other cross-sectional shapes will not be described here.

In one embodiment, heights of each of the desired protrusions formed from the planarization layer 80 or each of the desired notches formed from the planarization layer 80 range from 0.1 to 4 μm.

Figure 6:
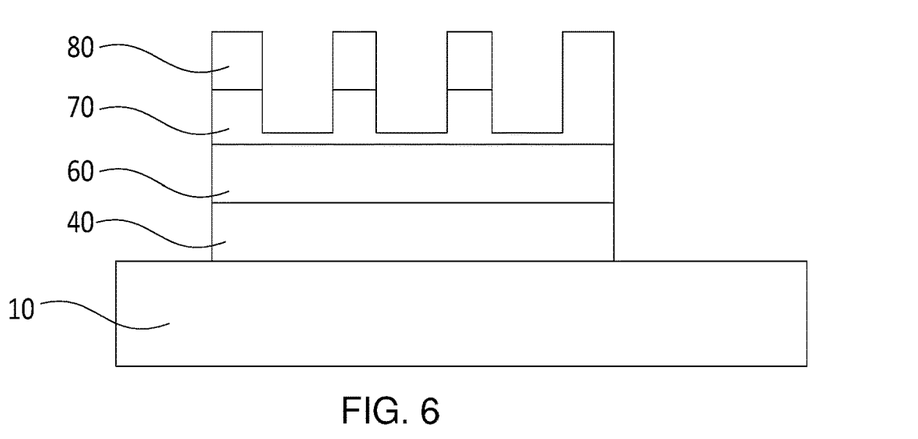
FIG. 6 is a sixth schematic structural diagram of a sealing region of a base plate according to one embodiment of the present invention.

In one embodiment, as shown in FIG. 6, in the sealing region, the array substrate further includes a gate electrode insulating layer 40, an insulating layer 60, and a passivation layer 70. At least one of the gate electrode insulating layer 40, the insulating layer 60, or the passivation layer 70 can form protrusions or notches with the planarization layer 80. By the above method, heights of the protrusions or notches are larger, so a surface area of the top layer in the sealing region is larger as well. As shown in FIG. 6, the passivation layer 70 and the planarization layer 80 form a plurality of notches together.

In one embodiment, the base plate is a color filter, and the top layer is a black matrix layer. A surface area of the black matrix layer in a sealing region is greater than an area of an orthographic projection of the black matrix layer on the substrate in the sealing region.

In one embodiment, the black matrix layer is generally formed by coating a resin material on a substrate. The black matrix layer is used for separating adjacent color resists, blocking gaps between the adjacent color resists, and avoiding light leakage and color mixing.

In one embodiment, the black matrix layer formed by coating the resin material on the substrate is exposed by a mask to form an exposed region. After that, the exposed region is developed to form a black matrix pattern and a plurality of protrusion patterns in a sealing region. Then, the black matrix pattern and the protrusion patterns are etched to form a desired black matrix and a plurality of desired protrusions.

In one embodiment, the black matrix layer formed by coating the resin material on a substrate is exposed by a mask to form an exposed region. After that, the exposed region is developed to form a black matrix pattern and a plurality of notch patterns in a sealing region. Then, the black matrix pattern and the notch patterns are etched to form a desired black matrix and a plurality of desired notches.

In one embodiment, a cross-sectional shape of each of the protrusions formed from the black matrix layer or each of the notches formed from the black matrix layer may be at least one of a rectangle, a triangle, an arc, or a trapezoid.

In one embodiment, heights of the protrusions formed from the black matrix layer or the notches formed from the black matrix layer range from 0.1 to 4 μm.

In one embodiment, the base plate is a color filter on array (COA) substrate, and the top layer is a planarization layer. A surface area of the planarization layer in a sealing region is greater than an area of an orthographic projection of the planarization layer on the substrate in the sealing region.

COA technology is an integrated technology that directly disposes a color filter on an array substrate. The color filter only includes a black matrix and a column spacer layer. The COA technology can not only effectively solve problems of an LCD device such as light leakage due to an alignment deviation between two substrates during a cell process, but also can significantly increase an aperture of the LCD device.

In one embodiment, a cross-sectional shape of each of the protrusions formed from the black matrix layer or each of the notches formed from the black matrix layer may be at least one of a rectangle, a triangle, an arc, or a trapezoid.

In one embodiment, heights of each of the desired protrusions formed from the black matrix layer or each of the desired notches formed from the black matrix layer range from 0.1 to 4 μm.

In one embodiment, the base plate is a color filter on array (COA) substrate, and the top layer is a planarization layer. A plurality of protrusions or notches are formed from the black matrix layer by exposures, development, and etching processes. A surface area of the black matrix layer in a sealing region is greater than an area of an orthographic projection of the black matrix layer on the substrate in the sealing region.

In one embodiment, a cross-sectional shape of each of the protrusions formed from the black matrix or each of the notches formed from the black matrix layer may be at least one of a rectangle, a triangle, an arc, or a trapezoid.

In one embodiment, heights of the protrusions formed from the black matrix or the notches formed from the black matrix layer range from 0.1 to 4 μm.

The present embodiment provides a base plate. The plurality of protrusions or notches are defined on a top layer, so a surface area of the top layer is greater than an area of an orthographic projection of the top layer on the substrate.

Figure 7:
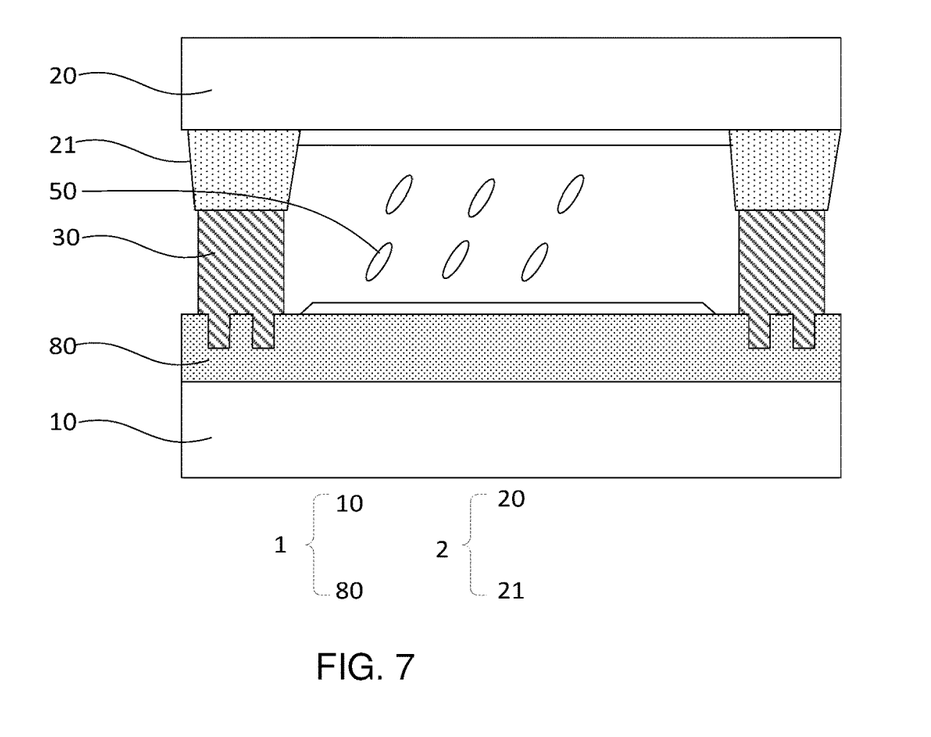
FIG. 7 is a first schematic structural diagram of a sealing region of a liquid crystal display (LCD) panel according to one embodiment of the present invention.

In one embodiment, as shown in FIG. 7, an LCD panel is provided including a first substrate 1, wherein the first substrate 1 comprises the above base plate; a second substrate 2 disposed corresponding to the first substrate 1; a sealant 30 disposed on a sealing region between the first substrate 1 and the second substrate 2 to form a sealed space, wherein a contact area between the sealant 30 and the first substrate 1 is greater than an area of an orthographic projection of the sealant 30 on the substrate 10; and a plurality of liquid crystals 50 filled in the sealed space.

Typically, the sealant 50 is made from acrylic, epoxy resin, and a photoinitiator. The sealant 50 is coated on a sealing region of a color filter and an array substrate. After that, the sealant 50 is cured by heat and/or ultraviolet (UV) light to seal the color filter and the array substrate. In addition to a function of seal the color filter and the array substrate, the sealant 50 can further separate a display region of the display panel from an outside environment, thereby avoiding air outside the display panel from entering the display region of the display panel.

Figure 8:
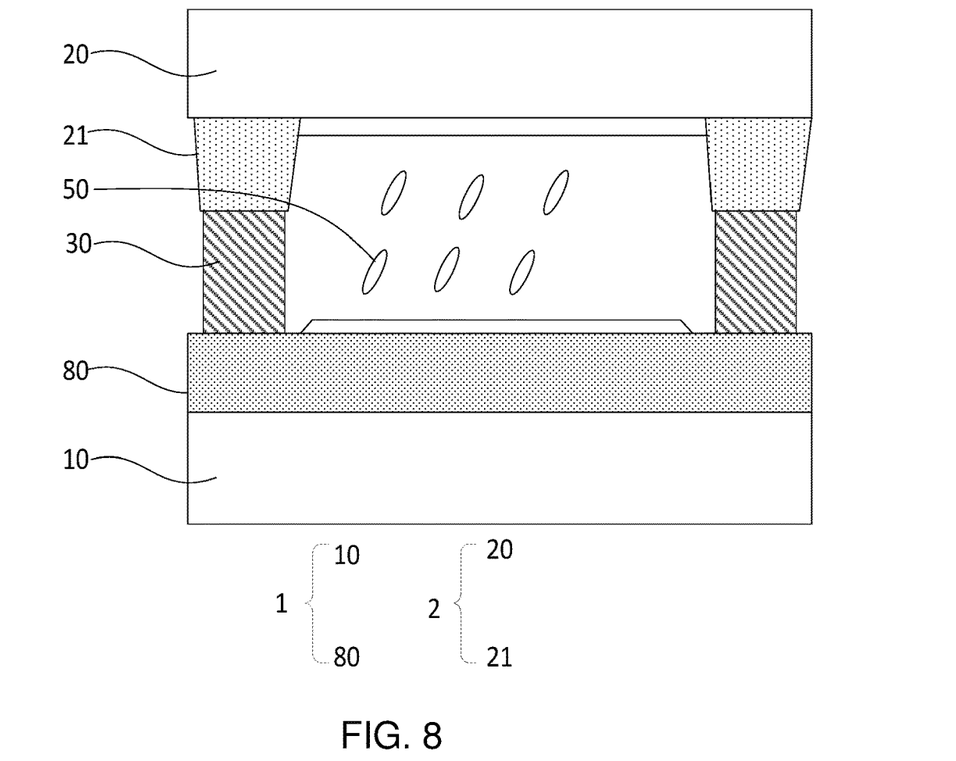
FIG. 8 is a schematic structural diagram of a sealing region of an LCD panel in prior art.

As shown in FIG. 8, a prior art LCD panel including a first substrate 1, a substrate 10 and a planarization layer 80 which are disposed on the first substrate 1, a second substrate 2, and a substrate 20, a black matrix layer 21, a sealant 30, and a liquid crystal layer 50 which are disposed on the second substrate 2. A contact area between the sealant 30 and the first substrate 1 is equal to an area of an orthographic projection of the sealant 30 on the substrate 10 disposed on the first substrate 1. A contact area between the sealant 30 and the second substrate 2 is equal to an area of an orthographic projection of the sealant 30 on the substrate 20 disposed on the second substrate 2. As display panels develop toward a narrow border, a sealing region is required to be narrower. However, if width of a sealant is too narrow, there will be a problem that adhesion between the sealant and a substrate is insufficient. An LCD provided by an embodiment of the present invention can solve the above problem.

Figure 9:
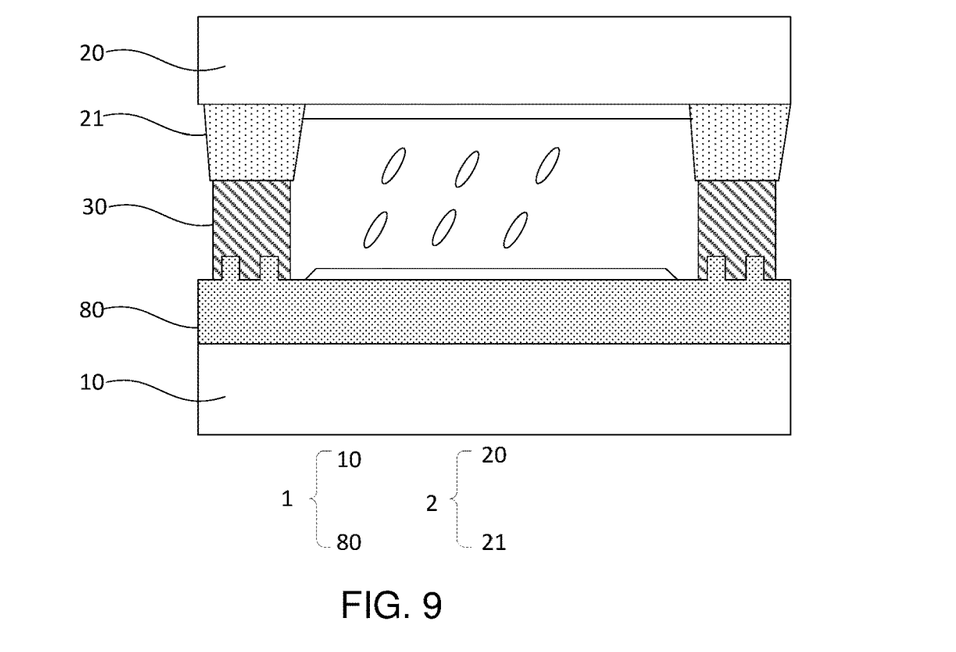
FIG. 9 is a second schematic structural diagram of a sealing region of an LCD panel according to one embodiment of the present invention.

In one embodiment, as shown in FIG. 9, the first substrate 1 is an array substrate, and the second substrate 2 is a color filter. A top layer of the first substrate 1 is a planarization layer 80, and a top layer of the second substrate 2 is a black matrix layer 21. A plurality of protrusion patterns are defined on the planarization layer 80 in a sealing region of the first substrate 1. A plurality of protrusions are defined on the black matrix layer 21 in a sealing region of the second substrate 2. A sealant 30 is disposed between the first substrate 1 and the second substrate 2.

In one embodiment, as shown in FIG. 9, the first substrate 1 is an array substrate, and the second substrate 2 is a color filter. A top layer of the first substrate 1 is a planarization layer 80, and a top layer of the second substrate 2 is a black matrix layer 21. A plurality of protrusion patterns are defined on the planarization layer 80 in a sealing region of the first substrate 1. A plurality of protrusions are defined on the black matrix layer 21 in a sealing region of the second substrate 2. A sealant 30 is disposed between the first substrate 1 and the second substrate 2.

In one embodiment, a plurality of notch patterns are defined on the planarization layer 80 in a sealing region of the first substrate 1. A plurality of notches are defined on the black matrix layer 21 in a sealing region of the second substrate 2, as shown in FIG. 7.

In one embodiment, a cross-sectional shape of each of the notches formed from the planarization layer or each of the protrusions formed from the planarization layer is at least one of a rectangle, a triangle, an arc, or a trapezoid.

In one embodiment, heights of the protrusions formed from the planarization layer or the notches formed from the planarization layer range from 0.1 to 4 μm.

In one embodiment, the sealant is disposed on a sealing region between the array substrate and the color filter to form a sealed space. On the array substrate, the sealant contacts the protrusions formed from the planarization layer or the notches formed from the planarization layer. A contact area between the sealant and the protrusions or the notches is greater than an area of an orthographic projection of the sealant on the array substrate, thereby increasing adhesion between the sealant and the array substrate.

Figure 10:
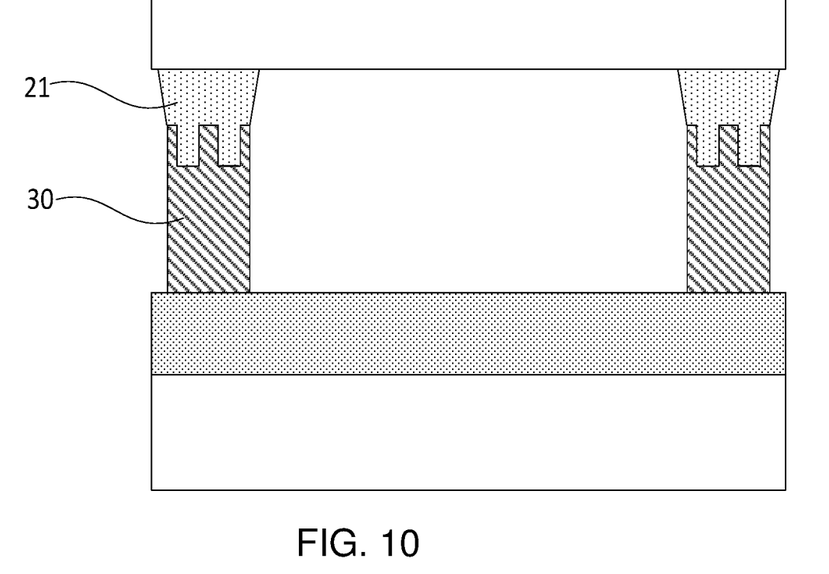
FIG. 10 is a third schematic structural diagram of a sealing region of an LCD panel according to one embodiment of the present invention.

In one embodiment, as shown in FIG. 10, the first substrate is a color filter, and the second substrate is an array substrate. A top layer of the first substrate is a black matrix layer 21. A plurality of protrusion patterns are defined on black matrix layer 21 in a sealing region of the first substrate 1.

In one embodiment, a plurality of notch patterns are defined on the black matrix layer in the sealing region of the first substrate.

In one embodiment, a cross-sectional shape of each of the protrusions formed from the black matrix layer or each of the notches formed from the black matrix layer is at least one of a rectangle, a triangle, an arc, or a trapezoid.

In one embodiment, heights of the protrusions formed from the black matrix layer or the notches formed from the black matrix layer range from 0.1 to 4 μm.

In one embodiment, the sealant is disposed on a sealing region between the array substrate and the color filter to form a sealed space. On the color filter, the sealant contacts the protrusions formed from the black matrix layer or the notches formed from the black matrix layer. A contact area between the sealant and the protrusions or the notches is greater than an area of an orthographic projection of the sealant on the substrate, thereby increasing adhesion between the sealant and the color filter.

In one embodiment, the second substrate also includes the base plate provided by the above embodiment.

Figure 11:
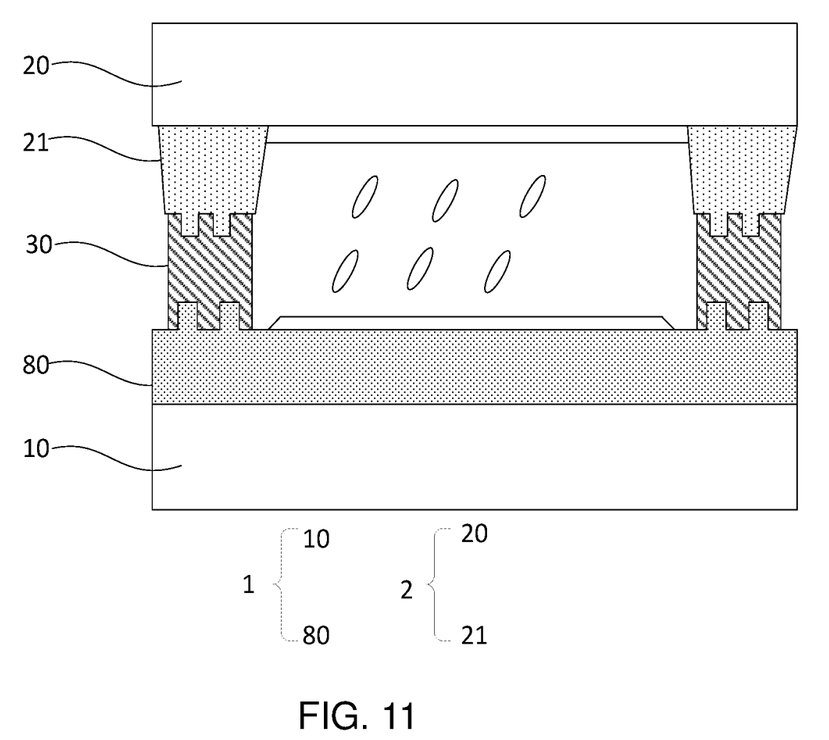
FIG. 11 is a fourth schematic structural diagram of a sealing region of an LCD panel according to one embodiment of the present invention.

In one embodiment, as shown in FIG. 11, the first substrate 1 is an array substrate, and the second substrate 2 is a color filter. A plurality of protrusion patterns are defined on the planarization layer 80 in a sealing region of the array substrate. A plurality of protrusions are defined on the black matrix layer 21 in a sealing region of the color filter.

In one embodiment, a cross-sectional shape of each of the notches or each of the protrusions is at least one of a rectangle, a triangle, an arc, or a trapezoid.

In one embodiment, heights of the protrusions range from 0.1 to 4 μm.

In one embodiment, the sealant 30 is disposed on a sealing region between the array substrate and the color filter to form a sealed space. The sealant 30 contacts the protrusions formed from the planarization layer 80. A contact area between the sealant 30 and the protrusions formed from the planarization layer 80 is greater than an area of an orthographic projection of the sealant 30 on the substrate 10 of the array substrate. The sealant 30 contacts the protrusions formed from the black matrix layer 21. A contact area between the sealant 30 and the protrusions formed from the black matrix layer 21 is greater than an area of an orthographic projection of the sealant 30 on the substrate 20 of the color filter. As a result, adhesion between the sealant, the array substrate, and the color filter is increased.

In one embodiment, the first substrate is an array substrate, and the second substrate is a color filter. A plurality of notch patterns are defined on the planarization layer in a sealing region of the first substrate. A plurality of notch patterns are defined on the black matrix layer in a sealing region of the second substrate.

In one embodiment, a cross-sectional shape of each of the notches is at least one of a rectangle, a triangle, an arc, or a trapezoid.

In one embodiment, heights of the notches range from 0.1 to 4 μm.

In one embodiment, the sealant is disposed on a sealing region between the array substrate and the color filter to form a sealed space. The sealant contacts the notches formed from the planarization layer. A contact area between the sealant and the notches formed from the planarization layer is greater than an area of an orthographic projection of the sealant on the substrate of the array substrate. The sealant contacts the notches formed from the black matrix layer. A contact area between the sealant and the notches formed from the black matrix layer is greater than an area of an orthographic projection of the sealant on the substrate of the color filter. As a result, adhesion between the sealant, the array substrate, and the color filter is increased.

Figure 12:
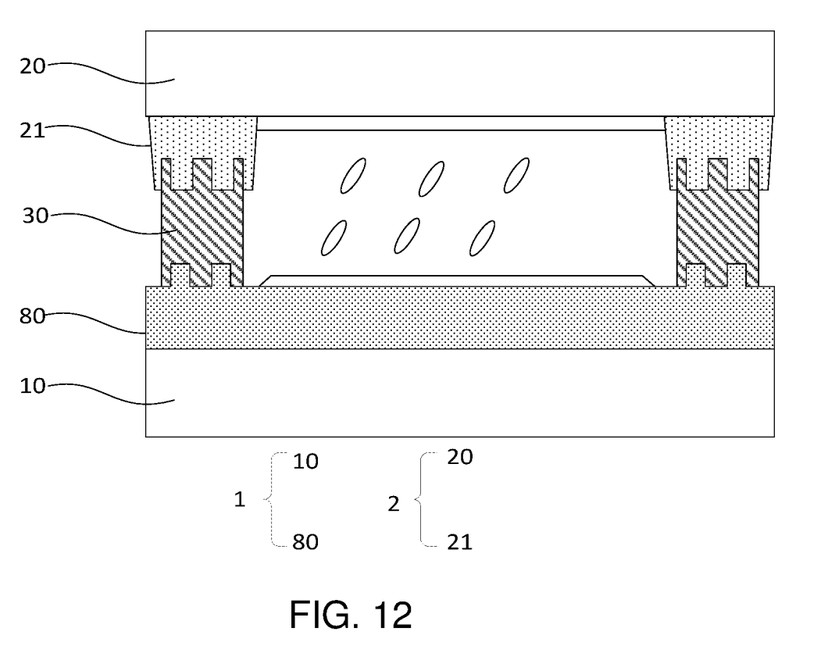
FIG. 12 is a fifth schematic structural diagram of a sealing region of an LCD panel according to one embodiment of the present invention.

In one embodiment, as shown in FIG. 12, the first substrate 1 is an array substrate, and the second substrate 2 is a color filter. A plurality of protrusion patterns are defined on the planarization layer 80 in a sealing region of the array substrate. A plurality of notch patterns are defined on the black matrix layer 21 in a sealing region of the color filter.

In one embodiment, a cross-sectional shape of the protrusions is at least one of a rectangle, a triangle, an arc, or a trapezoid.

In one embodiment, a cross-sectional shape of the notches is at least one of a rectangle, a triangle, an arc, or a trapezoid.

In one embodiment, heights of the protrusions range from 0.1 to 4 μm.

In one embodiment, heights of the notches range from 0.1 to 4 μm.

In one embodiment, the sealant 30 is disposed on a sealing region between the array substrate and the color filter to form a sealed space. The sealant 30 contacts the protrusions formed from the planarization layer. A contact area between the sealant 30 and the protrusions formed from the planarization layer is greater than an area of an orthographic projection of the sealant 30 on the substrate of the array substrate. The sealant 30 contacts the notches formed from the black matrix layer. A contact area between the sealant 30 and the notches formed from the black matrix layer is greater than an area of an orthographic projection of the sealant 30 on the substrate of the color filter. As a result, adhesion between the sealant 30, the array substrate, and the color filter is increased.

In one embodiment, the first substrate is an array substrate, and the second substrate is a color filter. A plurality of notches are defined on planarization layer in a sealing region of the array substrate. A plurality of protrusions are defined on the black matrix layer in a sealing region of the color filter.

In one embodiment, a cross-sectional shape of each of the protrusions is at least one of a rectangle, a triangle, an arc, or a trapezoid.

In one embodiment, a cross-sectional shape of each of the notches is at least one of a rectangle, a triangle, an arc, or a trapezoid.

In one embodiment, heights of the protrusions range from 0.1 to 4 μm.

In one embodiment, heights of the notches range from 0.1 to 4 μm.

In one embodiment, the sealant is disposed on a sealing region between the array substrate and the color filter to form a sealed space. The sealant contacts the protrusions formed from the planarization layer. A contact area between the sealant and the protrusions formed from the planarization layer is greater than an area of an orthographic projection of the sealant on the substrate of the array substrate. The sealant contacts the notches formed from the black matrix layer. A contact area between the sealant and the notches formed from the black matrix layer is greater than an area of an orthographic projection of the sealant on the substrate of the color filter. As a result, adhesion between the sealant, the array substrate, and the color filter is increased.

In one embodiment, the first substrate is a color filter, and the second substrate is an array substrate. In the present embodiment, a method of defining protrusions or notches on the top layer is the same as that of the above embodiment, and will not be described again here.

The present embodiment further provides an LCD device including the LCD panel described in the above embodiment, and will not be described again here.

The present invention provides a base plate, an LCD panel, and an LCD device. In a sealing region of the base plate, a plurality of protrusions or notches are defined on a top layer, thereby making a surface area of the top layer is greater than an area of an orthographic projection of the top layer on the substrate. At least one of a first substrate or second substrate of the LCD panel is the base plate. A sealant is disposed on a sealing region between the first substrate and the second substrate to form a sealed space. A plurality of protrusions or notches are defined on the top layer of at least one of the first substrate or the second substrate in the sealing region. A contact area between the sealant and the top layer is greater than an area of an orthographic projection of the sealant on the substrate. Therefore, a contact area between the sealant and the base plate is increased under the circumstance that width of the sealant is narrow, which solves the problem that adhesion between an array substrate and a color filter is not sufficient if the width of the sealant is too narrow.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A liquid crystal display (LCD) panel, comprising: a first substrate comprising a first base substrate and a first top layer disposed on the first base substrate, wherein the first top layer is a first uppermost single layer of the first substrate, and is a planarization layer; a second substrate disposed corresponding to the first substrate and comprising a second base substrate and a second top layer disposed on the second base substrate, wherein the second top layer is a second uppermost single layer of the second substrate, and is a black matrix layer; a sealant disposed on a sealing region between the first substrate and the second substrate to form a sealed space, wherein a contact area between the sealant and the second substrate is greater than an area of an orthographic projection of the sealant on the second substrate; and a plurality of liquid crystals filled in the sealed space, wherein the sealant is in direct contact with the first top layer and the second top layer, and a total area of a contacting surface of the second top layer in direct contact with the sealant in the sealing region is greater than an area of the orthographic projection of the second top layer on the second base substrate in the sealing region.

2. The LCD panel of claim 1, wherein a contact area between the sealant and the first substrate is greater than an area of an orthographic projection of the sealant on the first substrate; and wherein a total area of a contacting surface of the first top layer in direct contact with the sealant in the sealing region is greater than an area of the orthographic projection of the first top layer on the first base substrate in the sealing region.

3. The LCD panel of claim 2, wherein a plurality of protrusions protrude from a top surface of the first top layer in the sealing region, and a plurality of protrusions protrude from a top surface of the second top layer of the second substrate in the sealing region, and
wherein a height of each of the plurality of protrusions protruded from the first top layer and the second top layer ranges from 0.1 to 4 μm.

4. The LCD panel of claim 2, wherein a plurality of notches are defined in the first top layer of the first substrate in the sealing region and extends through a part of the first top layer of the first substrate, and a plurality of notches are defined in the second top layer of the second substrate in the sealing region and extends through a part of the second top layer of the second substrate, and
wherein a height of each of the plurality of notches defined in the first top layer and the second top layer ranges from 0.1 to 4 μm.

5. The LCD panel of claim 2, wherein a plurality of protrusions protrude from a top surface of the first top layer of the first substrate in the sealing region, and a plurality of notches are defined in the second top layer of the second substrate in the sealing region and extends through a part of the second top layer of the second substrate.

6. The LCD panel of claim 2, wherein a plurality of notches are defined in the first top layer of the first substrate in the sealing region and extends through a part of the first top layer of the first substrate, and a plurality of protrusions protrude from a top surface of the second top layer of the second substrate in the sealing region.

7. A liquid crystal display (LCD) device, comprising the LCD panel of claim 1.

* * * * *